Patented Apr. 24, 1934

1,955,731

UNITED STATES PATENT OFFICE 1,955,731

PHENOL RESIN AND PROCESS OF MAKING THE SAME

Howard L. Bender, Bloomfield, N. J., assignor to Bakelite Corporation, New York, N. Y., a corporation of Delaware No Drawing. Application November 11, 1926, Serial No. 147,843

7 Claims. (Cl. 260—4)

This invention relates to resinous condensation products of phenols and anhydro-formaldehyde-aniline, or of phenols, formaldehyde and aniline; and especially to molding mixtures or compositions containing potentially reactive resinous products of this character.

Aniline has heretofore been employed in relatively small proportions as a basic condensing agent in the manufacture of phenol resins, as disclosed for example in U. S. Patent 942,809, patented December 7, 1909, to L. H. Baekeland, and in British Patent 25,216 of 1907 to Helm, etc. It has also been used as a solvent for phenol resins of the reactive type in the manufacture of varnishes, lacquers and the like. When aniline is used as a condensing agent in the preparation of phenol-formaldehyde resins, it is assumed that anhydro-formaldehyde-aniline is first formed with liberation of water; and that this body then reacts with a portion of the phenol, setting free aniline, this cycle being repeated indefinitely, the aniline thus serving as a catalyst or condensing agent for the reaction.

Anhydro-formaldehyde-aniline has also been used as a methylene-containing hardening (i. e., polymerizing) agent in conjunction with phenol resins of the permanently fusible and soluble or non-reactive type, yielding reactive resins of excellent electrical properties, as disclosed in U. S. Patent 1,217,115, patented February 17, 1920, to Baekeland.

It has likewise been proposed to prepare resinous products by the direct condensation of phenols with anhydro-formaldehyde-aniline; but so far as I am aware the products heretofore prepared in this manner have been soft or semi-liquid, incapable of being adequately hardened (i. e., polymerized) by heating in closed molds after the ordinary manner of reactive phenolic resins, and hence unsuitable for use in compounding molding mixtures of acceptable nature.

The present invention relates to certain novel processes of preparing, by reactions involving phenols and anhydro-formaldehyde-aniline (or mixtures of aniline and formaldehyde or equivalent methylene-containing bodies), resinous products and molding mixtures containing the same, which are potentially reactive in the sense that they are directly transformable, by sufficient application of heat, into hard, infusible and insoluble resinoid products, of excellent insulating value and good physical characteristics. Such products, i. e., the potentially reactive phenolic condensation product and as well the final infusible, insoluble product, are hereinafter referred to simply as "resinoids".

My invention will be explained by reference to certain specific examples thereof, but it is to be clearly understood that the invention is not limited to the particular proportions recited in these examples, nor otherwise than as defined in the appended claims.

*Example I.*—100 parts by weight of phenol are mixed with 200 parts of anhydro-formaldehyde-aniline, and the mixture heated for 4 hours under a reflux condenser at a temperature of about 210° C. The resulting soft resin is thoroughly incorporated with a suitable filling material, for example, wood flour; and the mixture heated in vacuo or under reduced pressure or even under atmospheric pressure, under conditions to expel the free water together with a portion of the aniline, but under such controlled conditions of temperature and time that the composition retains its potentially reactive character. For example I have obtained good results by heating the mixture at 110° C. for 3 hours in a vacuum drying oven of standard type, although it is to be understood that I am not limited to these particular conditions. The resulting product is a molding mixture which can be utilized under standard hot-pressing conditions, and is potentially reactive in the sense defined above. During the vacuum-drying operation a greater or less proportion of the aniline is expelled and may be recovered and utilized in a repetition of the process, being directly available for example for the manufacture of anhydro-formaldehyde-aniline. The plasticity of the molding mixture may be controlled by regulating the quantity of aniline which is permitted to escape, care being taken to avoid destroying by excessive heating the potentially reactive nature of the resin. The proportion of anhydro-formaldehyde-aniline may be increased to four times the weight of phenol, still yielding potentially reactive resins.

*Example II.*—An essentially similar procedure is employed, except that a suitable catalyst or condensing agent of basic character is used to accelerate the reaction. In a particular instance there were employed, by weight:

500 parts phenol
800 parts 37.5% formaldehyde
250 parts aniline
5 parts hexamethylenetetramine On addition of the aniline to the mixture of the other ingredients, a precipitate was at first formed, considerable heat being evolved. The mixture was refluxed for two hours, and then connected to a condensing system and heated at 160° C. until freed from water and a portion of the aniline. The product was a potentially reactive resin suitable for the preparation of molding mixtures or varnishes, yielding a hard, infusible resinoid body on sufficient application of heat.

Larger or smaller proportions of hexamethylenetetramine may be used, replacing an equivalent quantity of the anhydro-formaldehyde-aniline. Other basic bodies may be used as catalysts, it being of course understood that when such bases as sodium carbonate, calcium hydroxid or the like are used, no replacement of anhydro-formaldehyde-aniline is involved.

*Example III.*—1000 parts by weight of phenol are heated for 1 hour with 500 parts of anhydro-formaldehyde-aniline, and the excess of phenol and aniline distilled off in vacuo, until the product solidifies on cooling to a hard, fusible, non-reactive resin. This resin is thoroughly mixed with 3 to 18% by weight of hexamethylenetetramine, imparting to it a reactive character, and rendering it suitable for the preparation of molding mixtures or varnishes. Approximately 10% of hexamethylenetetramine will usually be found satisfactory.

The proportions of anhydro-formaldehyde-aniline in the foregoing example may be increased up to twice the weight of the phenol and still yield resins which are either non-reactive or slowly reactive, being in either case preferably hardened in presence of some hardening agent such as hexamethylenetetramine, thus imparting sufficient speed of reaction to render them suitable for use in the preparation of molding mixes and varnishes.

*Example IV.*—Non-reactive or relatively slowly reactive resins prepared as in the foregoing example may be rendered potentially reactive by incorporation of methylene-containing hardening agents other than hexamethylenetetramine, and in particular by the employment for this purpose of anhydro-formaldehyde-aniline. Or mixtures of methylene-containing hardening agents, as for example a mixture of hexamethylenetetramine and anhydro-formaldehyde-aniline may be used for this purpose.

It will be observed that the foregoing examples have this in common, that in each case a reaction is brought about between a phenol (such as phenol, cresol or a homolog thereof) and anhydro-formaldehyde-aniline, with the resulting production of a hard (i. e., solid, not readily deformable) phenolic resin, which according to conditions may be either potentially reactive (Examples I and II) or non-reactive or relatively slowly reactive (Examples III and IV), possessing in the latter case the characteristic of the known non-reactive phenolic resins of being rendered potentially reactive by suitable additions of methylene-containing hardening agents, such as hexamethylenetetramine, anhydro-formaldehyde-aniline or mixtures thereof. In the preferred embodiment of my invention the condensation to the initial resin is effected in presence of more aniline than is desirable in the final product, the undesired excess being expelled in a subsequent stage of the process, and before hardening to the resinoid state.

It is to be understood that the aniline or anhydro-formaldehyde-aniline may be wholly or partly replaced by their homologs, or by other cyclic amines or their methylene derivatives, which are equivalent for the purposes of this invention.

I claim:

1. Process of making a phenolic resin, comprising reacting with a phenol upon anhydro-formaldehyde-aniline, the ratio of anhydro-formaldehyde-aniline to phenol being at least 2 parts to 1 part by weight, until a fusible, potentially reactive resinous condensation product is formed, and removing aniline therefrom while preserving the fusibility of the product by heating to a temperature not exceeding 210° C.

2. Process of making a phenolic resin, comprising reacting with a phenol upon anhydro-formaldehyde-alinine, the ratio of anhydro-formaldehyde-aniline to phenol being at least 2 parts to 1 part by weight, until a fusible, potentially reactive resinous condensation product is formed, and further hardening the resinous condensation product without transformation of the same to the final resinoid state by expelling aniline therefrom by heating at a temperature not exceeding 210° C. at subatmospheric pressure.

3. The hereindescribed potentially reactive-phenol-resin composition comprising the reaction product of a phenol and a reactive methylene compound made in the presence of anhydro-formaldehyde-aniline and of an additional base having catalytic properties and being more basic than anhydro-formaldehyde-aniline.

4. Process of making a phenolic resin, comprising reacting with a phenol upon anhydro-formaldehyde-aniline in the presence of free formaldehyde and of a catalyst more basic than anhydro-formaldehyde-aniline, the reaction mixture containing methylene in an amount with respect to the phenol to yield a potentially reactive resin, continuing the reaction until a fusible, potentially reactive resinous condensation product is formed, and removing aniline therefrom while preserving the fusibility of the product by heating at a temperature not exceeding 210° C.

5. Process of making a phenolic resin, comprising reacting with a phenol upon anhydro-formaldehyde-aniline in the presence of free formaldehyde and of a basic catalyst comprising hexamethylenetetramine, the reaction mixture containing methylene in an amount with respect to the phenol to yield a potentially reactive resin, continuing the reaction until a fusible, potentially reactive resinous condensation product is formed, and expelling aniline therefrom by heating at a temperature not exceeding 210° C., thereby avoiding complete transformation of the fusible resinous condensation product to the final resinoid state.

6. The herein described potentially reactive phenol-resin composition comprising the reaction product of phenol and anhydro-formaldehyde-aniline in the proportion of at least two parts of anhydro-formaldehyde-aniline to one part of phenol by weight.

7. The hereindescribed potentially reactive phenol-resin composition comprising the reaction product of a phenol, anhydro-formaldehyde-aniline and a methylene-containing hardening agent in the presence of a catalyst more basic than anhydro-formaldehyde-aniline.

HOWARD L. BENDER.